(12) United States Patent
Gagosz et al.

(10) Patent No.: US 7,726,160 B2
(45) Date of Patent: Jun. 1, 2010

(54) AUTOMATIC CYCLE STORAGE SYSTEM

(75) Inventors: Jean-Claude Gagosz, Bu (FR); Emmanuel Zeferino, Montigny le Breionneux (FR)

(73) Assignee: JCDecaux SA, Neuilly sur Seine (FR)

( * ) Notice: Subject to any disclaimer, the term of this patent is extended or adjusted under 35 U.S.C. 154(b) by 609 days.

(21) Appl. No.: 11/676,395

(22) Filed: Feb. 19, 2007

(65) Prior Publication Data
US 2007/0220933 A1  Sep. 27, 2007

(30) Foreign Application Priority Data
Feb. 21, 2006  (FR) .................................. 06 01514

(51) Int. Cl.
*E05B 73/00* (2006.01)
(52) U.S. Cl. ................ 70/233; 70/49; 70/235; 70/389; 211/5; 248/553
(58) Field of Classification Search ............ 70/30, 70/49, 233–236, 389; 248/551–553; 211/5
See application file for complete search history.

(56) References Cited

U.S. PATENT DOCUMENTS

| 2,691,288 | A |   | 10/1954 | Childs |
| 3,824,540 | A | * | 7/1974  | Smith, II ............... 340/427 |
| 3,934,436 | A | * | 1/1976  | Candlin et al. ............ 70/234 |
| 3,965,709 | A | * | 6/1976  | Belke ..................... 70/227 |
| 3,989,327 | A | * | 11/1976 | Candelaria ............... 312/100 |
| 4,033,160 | A | * | 7/1977  | Mima ..................... 70/233 |
| 4,776,188 | A | * | 10/1988 | Dalaba et al. ............. 70/49 |
| 4,794,770 | A | * | 1/1989  | Andersson et al. ......... 70/234 |
| 4,807,453 | A | * | 2/1989  | Bernier et al. ............ 70/233 |
| 4,830,167 | A | * | 5/1989  | Lassche .................. 194/247 |
| 5,197,310 | A | * | 3/1993  | Pedersen ................. 70/227 |
| 5,408,212 | A | * | 4/1995  | Meyers et al. ............ 340/427 |
| 5,823,021 | A |   | 10/1998 | Chang |
| 6,223,907 | B1| * | 5/2001  | Graber ................... 211/5 |
| 7,281,399 | B2| * | 10/2007 | Gagosz ................... 70/233 |

FOREIGN PATENT DOCUMENTS

EP          0026745         4/1981

(Continued)

OTHER PUBLICATIONS

Preliminary French Search Report FR 0601514; report dated Oct. 16, 2006.

(Continued)

*Primary Examiner*—Lloyd A Gall
(74) *Attorney, Agent, or Firm*—Miller, Matthias & Hull (57) ABSTRACT

An automatic cycle storage system comprising a plurality of cycles, each of which carries a locking member designed to be received in a keeper of a locking station. Each cycle includes an anti-theft cycle lock which, when it is in the position in which it immobilizes the cycle, prevents the cycle from being locked to a locking station.

9 Claims, 11 Drawing Sheets

FOREIGN PATENT DOCUMENTS

| | | |
|---|---|---|
| EP | 0763640 | 3/1997 |
| EP | 0875857 | 11/1998 |
| EP | 1 603 081 | 12/2005 |
| FR | 2 824 942 | 11/2002 |
| FR | 2 856 825 | 12/2004 |
| WO | WO 01/51342 | 7/2001 |
| WO | WO 01/54080 | 7/2001 |
| WO | WO 02/095698 | 11/2002 |
| WO | WO2005001781 | 1/2005 |

OTHER PUBLICATIONS

Helene Gefflot, "2000 Free Bicycles in Self Service", from Ouest-France Newspaper Cited Jun. 7, 1998.

Jozef De Coster, "Bicycles in the City", Mobilite Vélos from Industrie Magazine.

SmartBike, Creacom, Mar. 9, 2007, http://www.creacom.be/Smartbike/The%20Bikes.htm.

* cited by examiner

AUTOMATIC CYCLE STORAGE SYSTEM

FIELD OF THE INVENTION

The present invention relates to automatic cycle storage systems.

More precisely, the invention relates to an automatic cycle storage system comprising:
- a plurality of cycles (e.g. bicycles), each of which carries a locking member; and
- a plurality of fixed locking stations each of which is provided with at least one keeper adapted to receive the locking member of one of the cycles and to retain said locking member once said locking member reaches a locking position.

BACKGROUND OF THE INVENTION

Such a cycle storage system can be used, for example, to make cycles available to the public, subject to the person who is borrowing the cycle being identified, and optionally subject to a rental being paid at a control terminal post.

Document WO-A-02/095698 describes an example of such a cycle storage system which is entirely satisfactory.

A particular object of the present invention is to improve further devices of that type, in particular in order to guarantee that a borrowed cycle cannot be locked to a fixed locking station unbeknown to the person who has borrowed it, during a temporary halt.

SUMMARY OF THE INVENTION

To this end, according to the invention, a cycle storage system of the type in question is characterized in that each cycle has an anti-theft cycle lock which, when it is in the position in which it immobilizes the cycle, prevents the cycle from being locked to the locking station.

By means of these features, it is merely necessary for the user to immobilize the cycle by means of the anti-theft cycle lock during a temporary halt in order to prevent a third party from locking the cycle to a locking station in the user's absence.

In various embodiments of the invention, it is optionally possible to use one or more of the following provisions:

- the anti-theft cycle lock comprises a flexible tie that extends between a first end that is secured to the cycle and a second end that is secured to a rigid pin which is adapted to be locked in a socket secured to the cycle when the anti-theft cycle lock immobilizes the cycle, the socket being disposed so that the pin of the anti-theft cycle lock extends substantially horizontally while preventing the cycle from being locked to the locking station when said pin of the anti-theft cycle lock is engaged in said socket;
- the socket is in the vicinity of the locking member and is disposed so that the pin of the anti-theft cycle lock extends substantially horizontally on the same side as the locking member when said pin of the anti-theft cycle lock is engaged in said socket;
- the socket is disposed towards the front relative to the locking member in the insertion direction in which said locking member is inserted into the keeper;
- the socket is provided in a box that carries the locking member and that is secured to the cycle;
- the cycle also has a lock operated by a key and enabling the key to be extracted from the lock only when the key is in a predetermined angular position, the lock also having a latch that is mounted to move with the key and that is adapted to co-operate with the pin of the anti-theft cycle lock when the pin of the anti-theft cycle lock is engaged in the socket, the latch also being adapted to co-operate with the pin of the anti-theft cycle lock so that said key is in said predetermined angular position only when the pin of the anti-theft cycle lock is locked in the socket;
- the latch is adapted to penetrate into said socket when said key is in the predetermined position, said latch being urged resiliently towards a locking position corresponding to said predetermined angular position of the key, the socket also including a slidably mounted blocking member that is urged towards a rest position in which said blocking member prevents the latch from reaching said locking position, said locking member being adapted to be pushed back by the pin of the anti-theft cycle lock while enabling said pin of the anti-theft cycle lock to co-operate with the latch;
- the pin of the anti-theft cycle lock is provided with a side recess adapted to receive the latch;
- the lock is surrounded at least partially by a key-cover wall that projects towards the keeper and that is adapted to mask the key when the cycle is locked to the locking station; and
- the keeper is adapted to prevent the anti-theft cycle lock from being placed in a position in which it immobilizes the cycle when said cycle is locked to the locking station.

Other characteristics and advantages of the invention appear from the following description of one of the embodiments thereof, given by way of non-limiting example, and with reference to the accompanying drawings.

In the various figures, like references designate elements that are identical or similar.

DETAILED DESCRIPTION OF THE INVENTION

Figure 1:
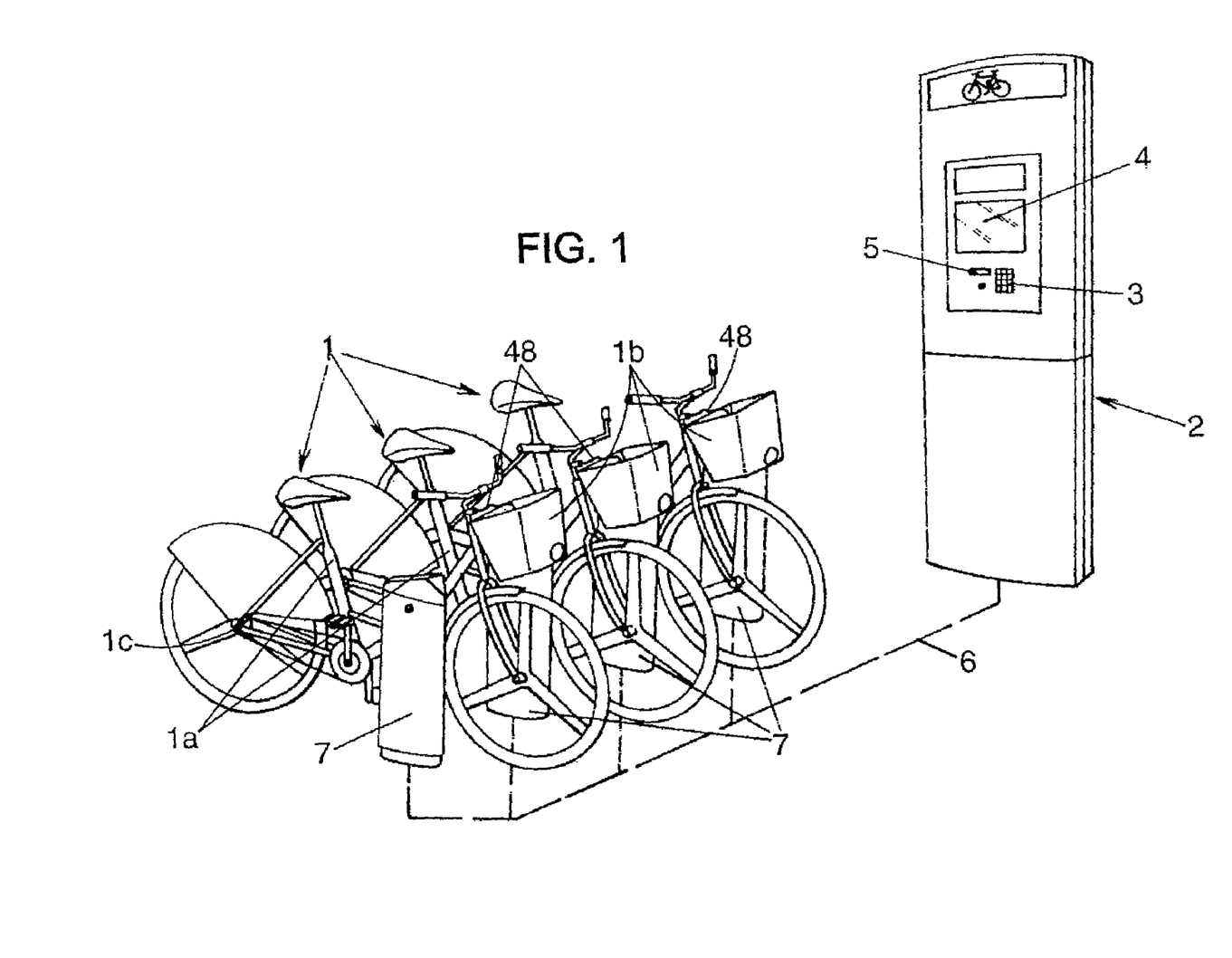
FIG. 1 is a diagrammatic perspective view showing an embodiment of an automatic cycle storage system of the invention.

As shown in FIG. 1, the present invention relates to a system for automatically storing cycles 1 such as, in particular, bicycles, making it possible, for example, to store the cycles on a public thoroughfare so as to make them available to the public.

The automatic cycle storage system can have a plurality of cycle storage areas, one of which is shown in FIG. 1. Each cycle storage area is provided with an interactive terminal post 2 that is provided with a user interface comprising, for example, a keypad 3, a screen 4, and an electronic card reader 5 for reading handheld electronic cards.

The interactive terminal post 2 is connected, e.g. via an underground wire link 6, to a plurality of locking stations 7 that can, for example, be in the form of locking terminal posts fastened to the ground on a public thoroughfare.

Figure 2:
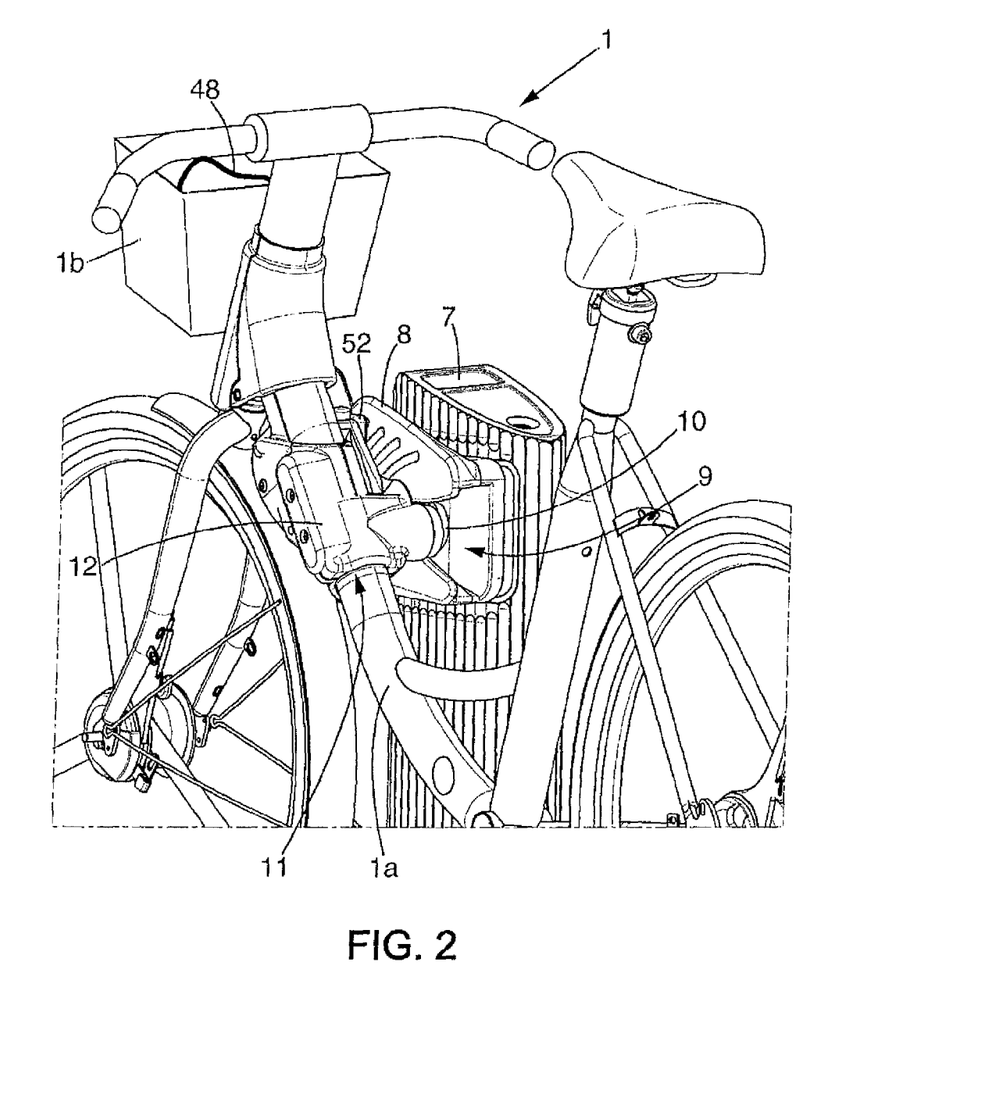
FIG. 2 is a detail view showing how a cycle is locked to one of the locking stations of FIG. 1.

As can be seen in FIG. 2, each locking station 7 is provided with a keeper 8 forming a box provided with a flared opening 9 that opens out horizontally and that is adapted to receive and to retain a locking member 10 that belongs to a locking device 11 secured to, for example, the frame 1a of one of the cycles 1.

Figure 3:
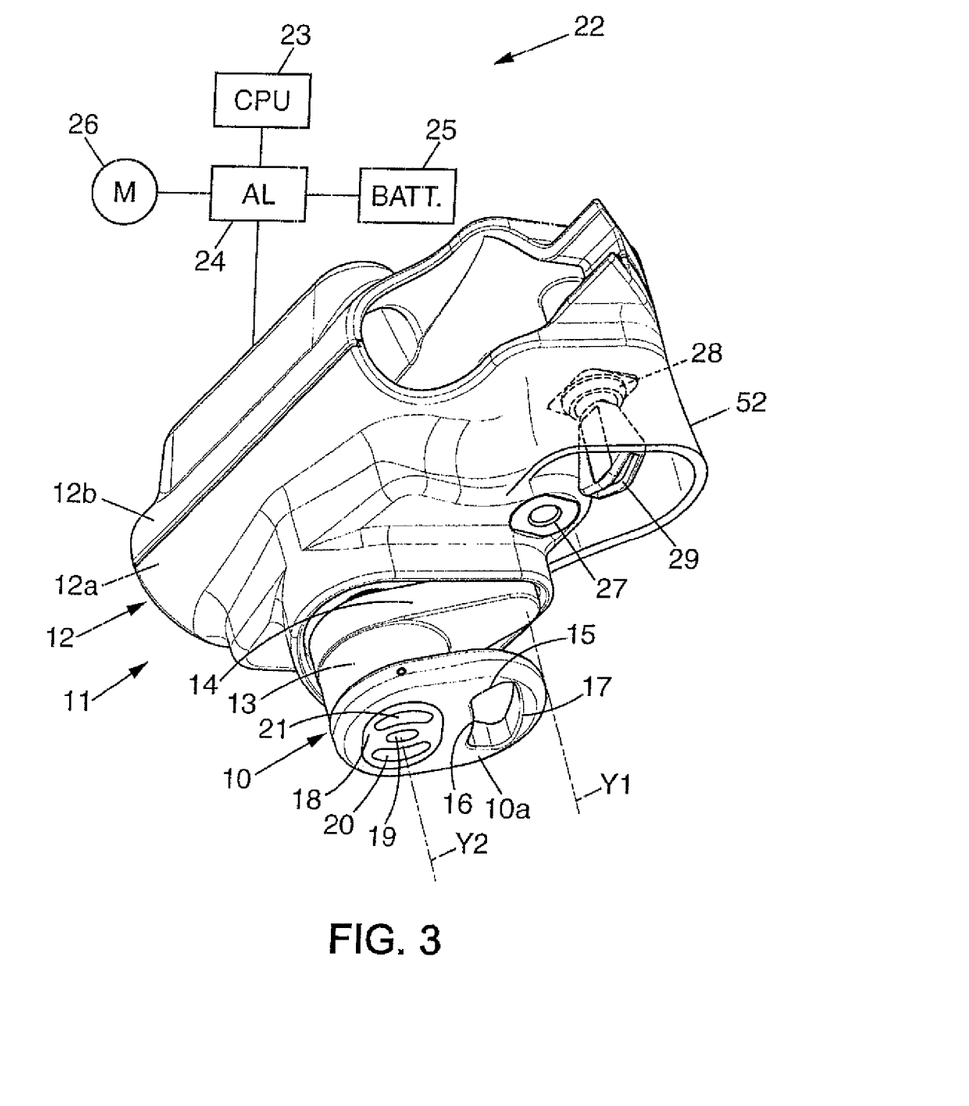
FIG. 3 is detail view showing the locking device carried by the cycle of FIG. 2.

As can be seen in FIG. 3, the locking device 11 can include a support 12 which can, for example, be made in two portions 12a, 12b that are secured together while clamping around one of the tubes of the frame of the cycle. The locking member 10 is mounted to move on the support 12 in a manner such as to allow the locking member 12 to move to some extent at least vertically relatively to said cycle.

More particularly, the locking member 10 can be mounted to pivot relative to the support 12 about a horizontal pivot axis Y1. In the example shown in the drawings, the locking member 10 comprises a vertical metal plate 10a that is secured to a hub 13 that is circularly cylindrical and that has a central axis Y2 that is parallel to the axis Y1 and that is offset relative to Y1, the hub 13 itself being secured to a lever arm 14 that is mounted to pivot on the support 12 about the pivot axis Y1.

The locking member 10 extends forwards, i.e. towards the pivot axis Y1, from the hub 13. At its front end, said locking member 10 is provided with a through slot 15 that opens out parallel to the axes Y1, Y2 and that has a circularly arcuate radially inner edge 16 and a circularly arcuate radially outer edge 17, which edges are substantially centered on the central axis Y2. In addition, in register with the hub 13, the plate 10a of the locking member 10 has an electrically insulating zone 18 which faces away from the box 12, and in which three electrically conductive contact zones are formed, namely:

a central contact zone 19 that is plane and that is disposed in register with the central axis Y2, said central contact zone 19 preferably being elongate substantially horizontally; and two contact zones 20, 21 that are curved in general shape, that are elongate substantially horizontally, and that are disposed on either side of the central contact zone, said two contact zones that are curved in general shape being plane and each having a concave side facing the central axis Y2.

It should be noted that the locking member 10 could have a number of contact zones 19-21 different from three (e.g. two contact zones), said contact zones preferably including at least one contact zone that is curved in general shape and that has a concave side facing the central axis Y2.

The contact zones 19-21 make it possible, when the cycle 1 is locked to a locking terminal post 7, to connect said locking terminal post electrically to an electrical circuit 22 belonging to the cycle 1. The electrical circuit 22 can, for example, include at least one electronic central processing unit 23 (CPU) adapted to communicate with the locking terminal post 7. In this example, the electrical circuit 22 also includes a power circuit 24 (AL) that is connected to the electronic central processing unit 23 and to a battery 25 (BATT.) and also to an assistance electric motor 26 (M) that can, for example, be housed in a wheel hub 1c (see FIG. 1) of the cycle so as to assist in propelling the cycle while said cycle is being used. In which case, the contact zones 19-21 serve not only to cause the locking terminal post 7 to communicate with the electronic central processing unit 23, but also to recharge the battery 25 which then makes it possible to power the electric motor 26 while said motor is being used.

In addition, as explained in more detail below, the support 12 of the locking device is also provided with a socket 27 for receiving an anti-theft cycle lock and with a lock 28 provided with a key 29 for locking the anti-theft cycle lock.

Figure 4:
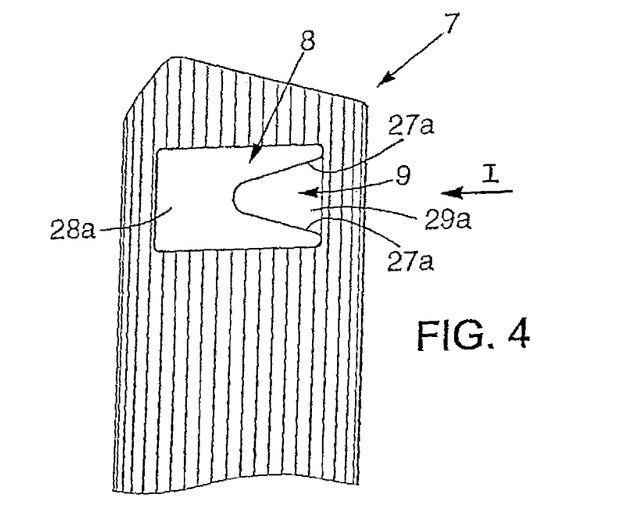
FIG. 4 is a side view of the locking terminal post to which the cycle of FIG. 2 is locked.
Figure 5:
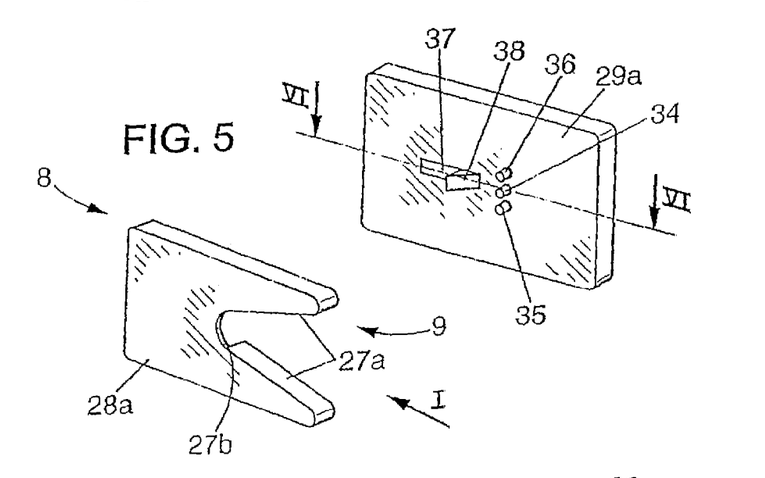
FIG. 5 is a simplified exploded perspective view of the keeper of the locking terminal post of FIG. 4.

As shown in FIGS. 4 and 5, the flared opening 9 of the keeper 8 advantageously has two ramp-shaped guides 27a converging towards each other in the insertion direction I in which the locking member is inserted into the keeper Said guides 27a are to be adapted to co-operate with the plate 10a of the locking member in order to move the locking member 10 about the pivot axis Y1 until it reaches a nominal locking position relative to the keeper 8. It is thus possible to guarantee that the locking member 10 and more particularly the slot 15 in said locking member finds itself at the correct height relative to the keeper 10 after it has been inserted into the keeper in the insertion direction I. As can be seen in FIG. 5, the keeper 8 is made up of a base 29a and of a lid 28a including, for example, the flared opening 9 and the guides 27a.

Figure 6:
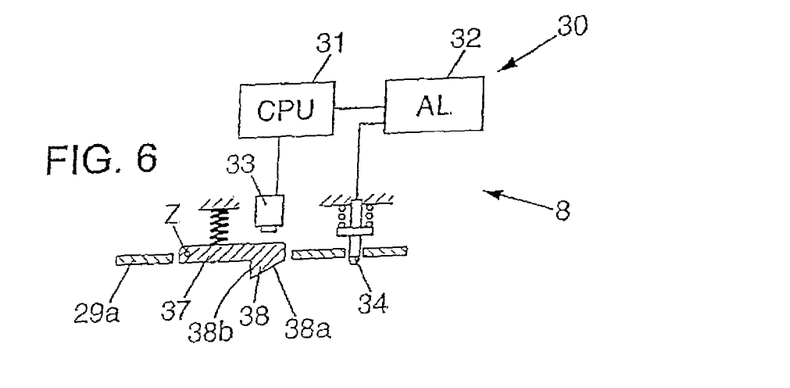
FIG. 6 is a diagram showing the principle of operation of the keeper of FIG. 5, shown in the form of a section taken on line VI-VI of FIG. 5.

As can be seen in FIGS. 5 and 6, the base 29a can be provided with an electrical circuit 30 including, for example, an electronic central processing unit 31 (CPU), a power circuit 32 (AL), an electromagnet (33), and three electrical contacts 34, 35, 36 that can, for example, be in the form of pins projecting from the base 29 and adapted to come into contact with respective ones of the electrical contact zones 19, 20, 21 of the locking member when the cycle is locked to the locking terminal post 7. The electrical contacts 34, 35, 36 can, for example, be substantially in line vertically.

In addition, the base 29a also has a catch member 37 such as, for example, a hook mounted to pivot about a vertical axis Z and provided with a tine 38 projecting relative to the base 29a. The hook 37 is urged resiliently towards a rest position in which the tine 38 projects relative to the base 29a, so that, when the locking member 10 is engaged in the keeper 8 in the insertion direction I, the tine 38 is pushed back into a retracted position by co-operation between a sloping surface 38a of the tine 38 and the front edge of the plate 10a, and then said tine 38 engages in the slot 15 in the plate 10a while then retaining said plate by co-operation between a stop edge 38b belonging to the tine and the outer edge 17 of the slot 15.

In this position, the hub 13 of the locking member is preferably in contact with the end edge 27b of the flared opening 9 in the lid 28a, so that the cycle 1 is then locked to the locking terminal post 7 with a small amount of clearance. The relative positions of the tine 38 and of the contacts 34-36 relative to the locking member 10 are shown in chain-dotted lines in FIG. 7, when the cycle 1 is in the position in which it is locked to the locking terminal post 7.

Figure 7:
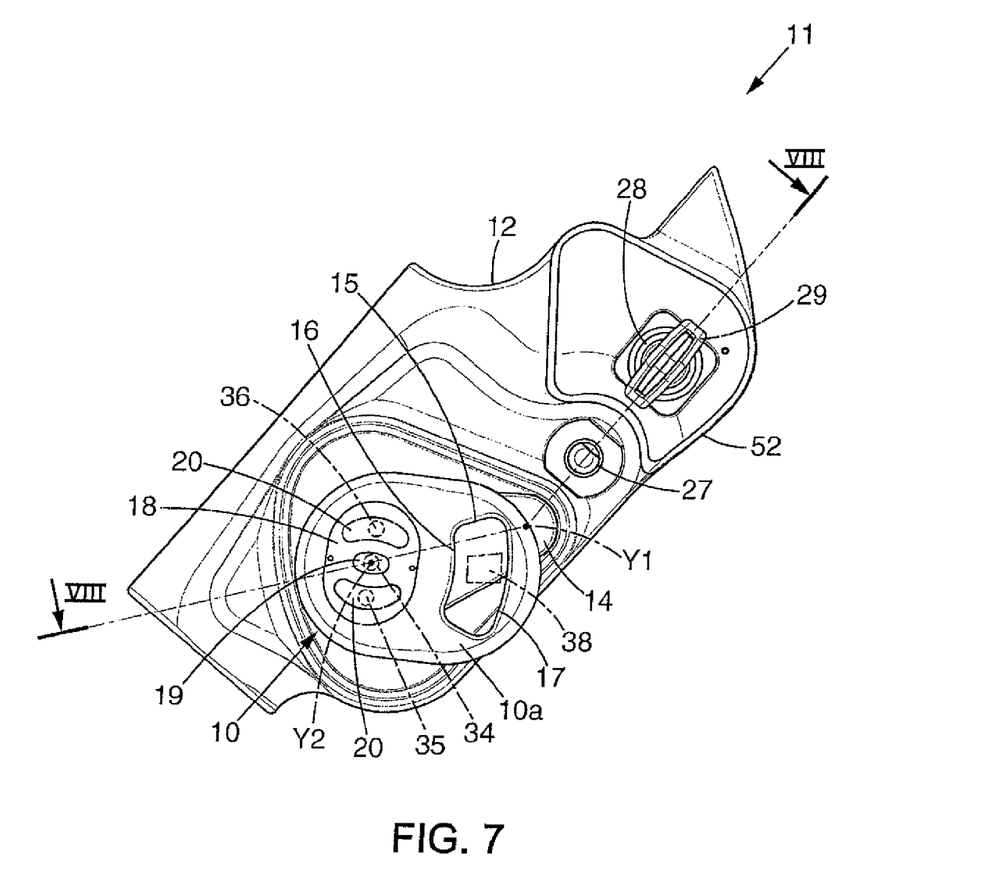
FIG. 7 is a side view of the locking device of FIG. 3.

The catch member 37 can also be moved to a retracted position by the electromagnet 33 so as to make it possible to remove the cycle 1 from the locking terminal post 7.

Figure 8:
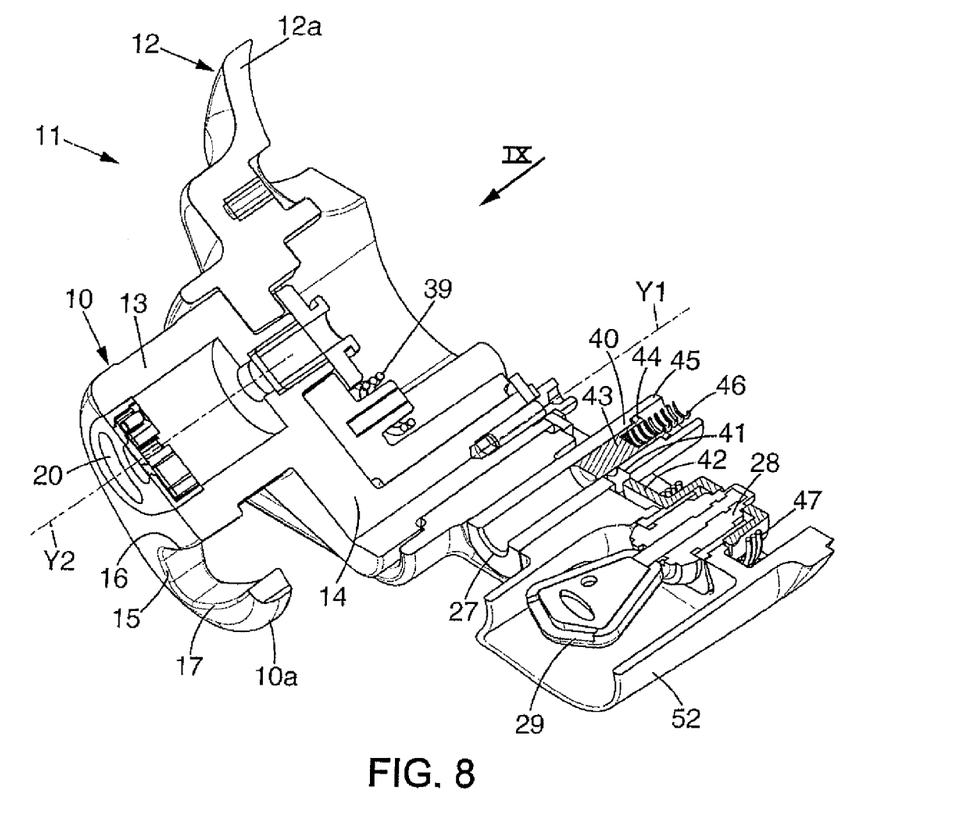
FIG. 8 is a section view on line VIII-VIII of FIG. 7.
Figure 9:
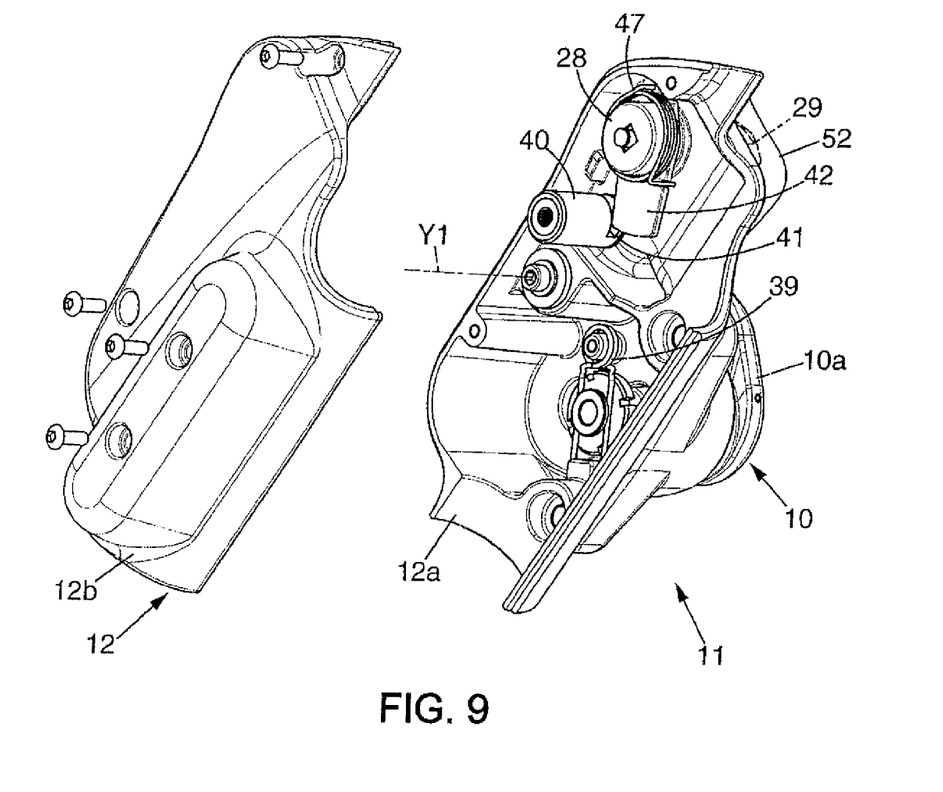
FIG. 9 is an exploded view of the locking device of FIGS. 7 and 8, seen looking in the direction IX shown in FIG. 8.

As shown in FIGS. 8 and 9, the locking member 10 is urged resiliently towards a rest position by a spring 39. In addition, the above-mentioned socket 27 for receiving the anti-theft cycle lock is defined by a hollow sleeve 40 that extends horizontally and that has a vertical side slot 41 in which a latch can penetrate that can, for example, be in the form of a vertical strip 42 mounted to turn with the key 29 and with the moving portion of the lock 28, said strip 42 being urged resiliently towards the slot 41 by a spring 47.

A catch member such as a cylindrical slug 43 is mounted to slide in the socket 27. Said slug 43 is provided with a wider head 44 that is disposed towards the inside of the support 12, which head 44 slides in a wider portion 45 of the socket 27. A spring 46, which bears against a portion of the support 12, pushes the head 44 back, thereby resiliently urging the slug 43 towards a rest position in which the head 44 bears against the shoulder which defines the wider portion 45 of the socket.

In said rest position, the slug 43 covers the slot 41 and prevents the strip 42 from penetrating fully into said slot 41 and into the socket 27, so that the key 29 remains in an angular position in which it cannot come out of the lock 28.

Figure 10:
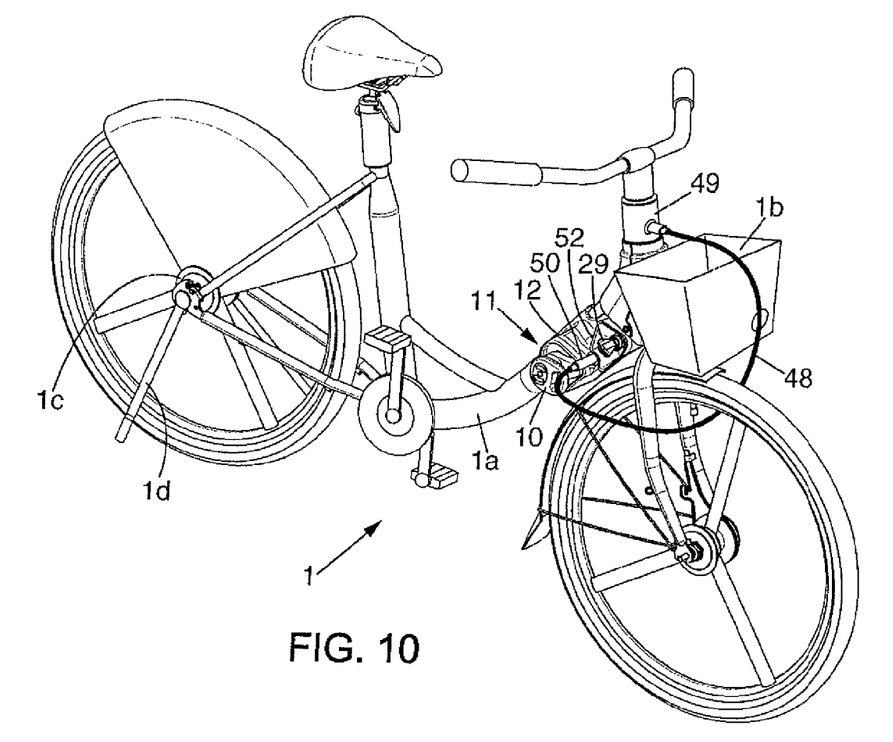
FIG. 10 is a diagrammatic overall view of the cycle of FIG. 2 in a temporary halt position, with its anti-theft cycle lock locked.

As shown in FIG. 10, each cycle 1 also includes an anti-theft cycle lock 48 which can, for example, be in the form of a metal cable or the like having one end fastened rigidly to the frame 1a of the cycle, for example, at the fastener 49 of a basket 1b situated at the front of the cycle, At its opposite end, the anti-theft cycle lock 48 is terminated by a rigid metal pin 50 that is adapted to be received in the above-mentioned socket. The anti-theft cycle lock 48 enables the user to immobilize the cycle 1 temporarily, which cycle can then stand, for example, on a kickstand 1d mounted on the frame 1a.

Figure 11:
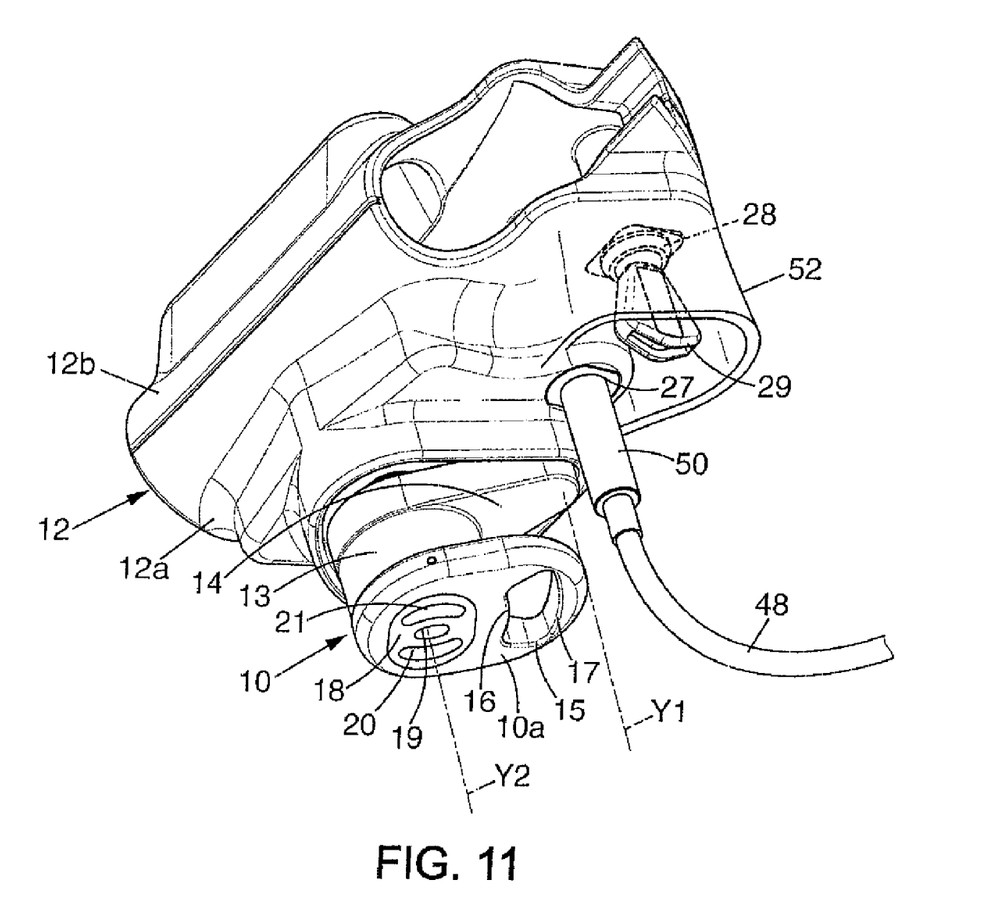
FIG. 11 is a detail view of FIG. 10 showing the locking device of the cycle with the anti-theft cycle lock locked, the anti-theft cycle lock key not yet having been removed by the user.
Figure 12:
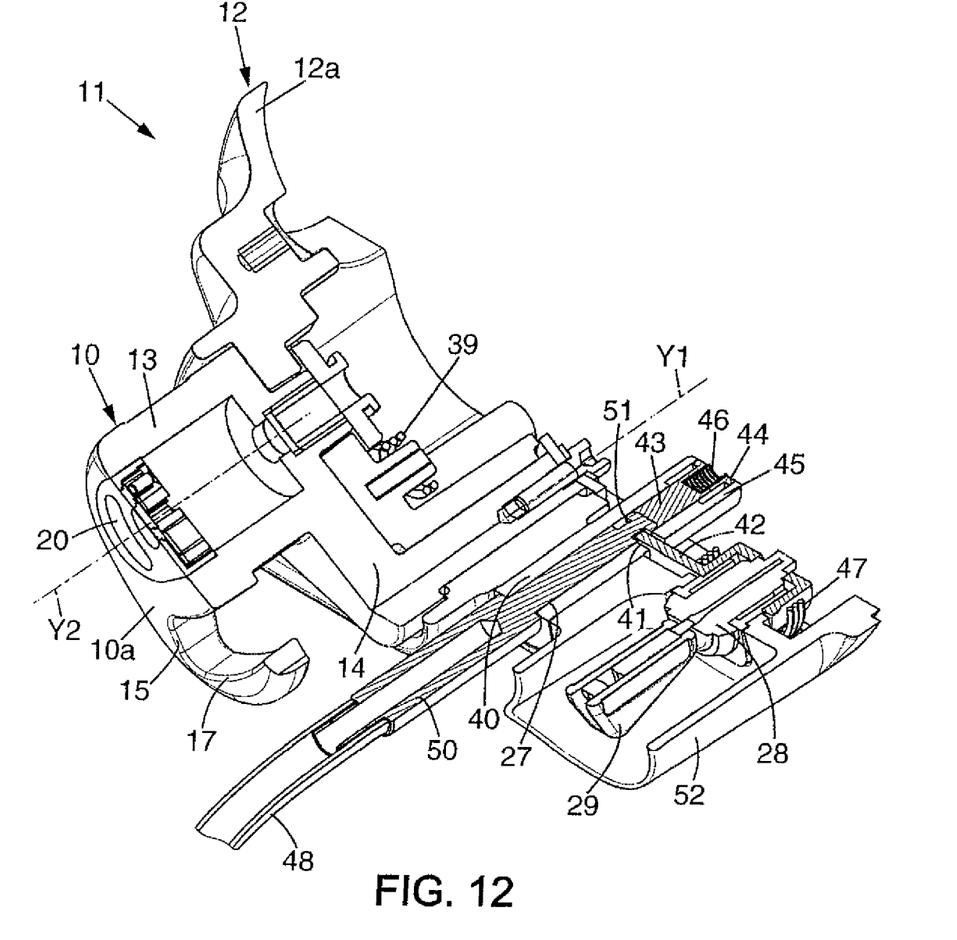
FIG. 12 is a section view similar to the FIG. 8 view showing the locking device with its anti-theft cycle lock locked.

As can be seen in more detail in FIGS. 11 and 12, when the pin 50 is received in the socket 27, it prevents the cycle 1 from being put back in place on a locking terminal post 7, since said pin then prevents the locking member 10 from penetrating into the keeper 8 of the locking terminal post.

Figure 13:
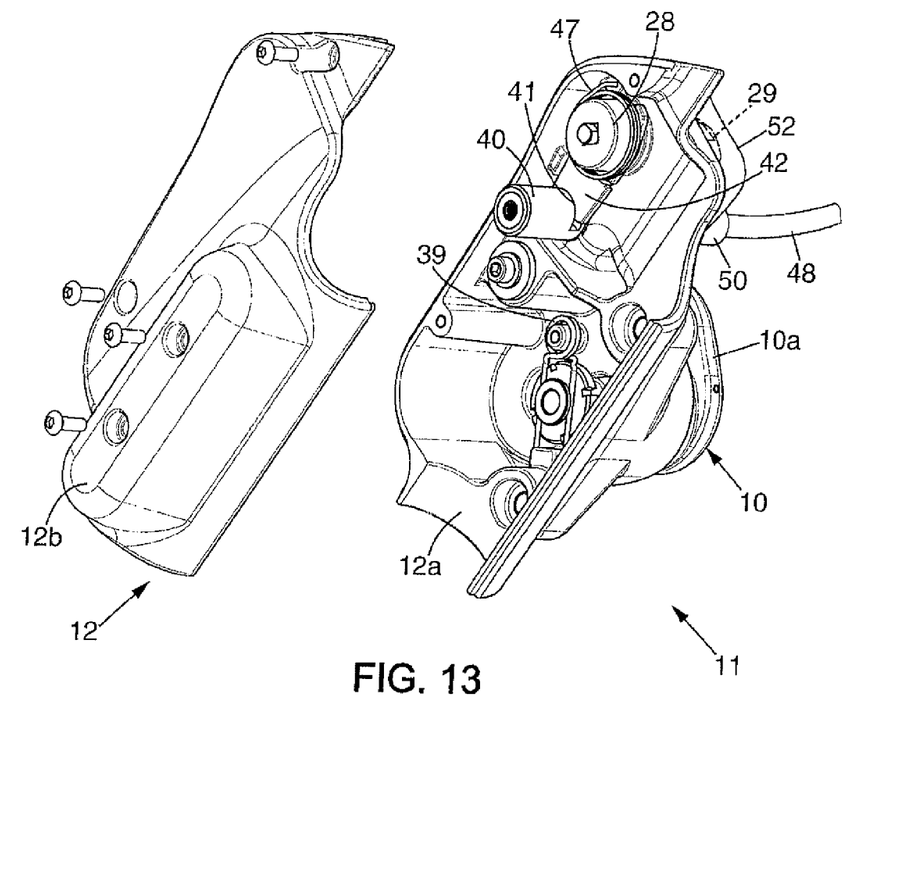
FIG. 13 is an exploded view similar to the FIG. 9 view, showing the locking device with its anti-theft cycle lock locked.

As shown in FIGS. 12 and 13, when the pin 50 of the anti-theft cycle lock 48 is inserted in the socket 27, it pushes the slug 43 back towards the inside of the support 12 while compressing the spring 46 until said pin comes into an abutment position in which a side recess such as an annular groove 51 provided in the pin 50 comes into register with the slot 41 in the sleeve 40 which defines the socket 27. In this position, the strip 42 can penetrate fully into the slot 41 and into the groove 51 under the action of the spring 47, by turning until it reaches an angular position in which it is possible for the key 29 to be removed from the lock 28.

The above-described device operates as follows.

When the user wishes to borrow a cycle 1 on one of the locking terminal posts 7, said user can, for example, insert a handheld electronic card into the reader 5 of the interactive terminal post 2 and then input a secret code by means of the keypad 3, so as to be identified by said interactive terminal post, The interactive terminal post 2 then controls the keeper 8 of one of the locking terminal posts 7 so as to unlock the cycle 1 in place on that terminal post. The user can then take the cycle 1 and the electronic central processing unit 31 of the cycle then identifies that the cycle 1 has been removed because it can no longer communicate with the electronic central processing unit 23 of the cycle. The electronic central unit 31 of the locking terminal 7 then informs the interactive terminal post 2 of the removal.

So long as the cycle 1 is in the storage position or is being used normally, its anti-theft cycle lock 48 is merely stowed in the basket 1b (see FIGS. 1 and 2), and the key 29 cannot be removed from the lock 28, as explained above.

In addition, so long as the cycle 1 is locked to the terminal post 7, said terminal post 7 and the keeper 8 prevent the pin 50 of the anti-theft cycle lock from being inserted into its socket 27. In this position, the key 29 is also preferably masked by a key-cover wall 52 (see, for example, FIG. 3) which surrounds the key at least partially and which opens out facing the keeper 8 (see FIG. 2).

While the cycle is being used, when the user wishes to lock it temporarily, said user threads the anti-theft cycle lock 48 through the front wheel of the cycle and engages the pin 50 of the anti-theft cycle lock into the socket 27 of the support 12 (position in which the cycle is immobilized), so that the strip 42 of the lock 28 locks the pin 50 to the support 12, and so that the key 29 of the anti-theft cycle lock turns until it reaches a position in which it can be removed form the support 12 as explained above. The user thus removes the key 29 from the lock 28, so that the cycle is immobilized temporarily. When the user wishes to use the cycle again, it suffices for said user to insert the key 29 into the lock 28 and to turn said key in order to release the pin 50 of the anti-theft device, whereupon the anti-theft cycle lock 48 is stowed once again in the basket 1b of the cycle.

When the user returns the cycle 1 and puts it in place on a locking terminal post 7, said user engages the locking member 10 in the keeper 8 of the locking terminal post. During this movement, the locking member 10 pivots about the pivot axis Y1, while being guided by the guides 27a of the keeper 8, so that the slot 15 of said locking member is exactly in register with the tine 38 of the catch member and so that the contact zones 19-21 of the cycle are exactly in register with the contacts 34-36 of the keeper. The electronic central processing unit 31 of the locking terminal post can then communicate with the electronic central processing unit 23 of the cycle via at least some of the contacts 19-21 and 34-36 so as to identify the cycle and so as to inform the interactive terminal post 2 that the cycle has been returned. In addition, in the example considered herein, the electrical circuit 30 of the locking terminal post 7 can then recharge the battery 25 of the cycle 1 via at least some of the contacts 19-21 and 34-36. Optionally, the contacts 19-21 and 34-36 could be replaced by contactless communications interfaces (e.g. operating by induction), in particular if the cycle 1 were not provided with a motor 26.

In should be noted that, when the cycle is borrowed and returned, the interactive terminal post 2 can communicate with a central cycle management station (not shown) optionally connected to a plurality of cycle storage areas and thus to a plurality of interactive terminal posts 2.

It should also be noted that, in a variant of the invention, the lock 28 and the key 29 could be replaced with an electronic locking system, e.g. with a code system.

The invention claimed is:

1. An automatic cycle storage system comprising:
a plurality of cycles, each of which carries a locking member; and
a plurality of fixed locking stations each of which is provided with at least one keeper adapted to receive the locking member of one of the cycles and
said automatic cycle storage system being characterized in that each cycle has an anti-theft cycle lock which, when it is in the position in which it immobilizes the cycle, prevents the cycle from being locked to the locking station, the anti-theft cycle lock includes a flexible tie that extends between a first end that is secured to the cycle and a second end that is secured to a rigid pin which is adapted to be locked in a socket secured to the cycle when the anti-theft cycle lock immobilizes the cycle, the socket being disposed so that the pin of the anti-theft cycle lock extends substantially horizontally while preventing the cycle from being locked to the locking station when said pin of the anti-theft cycle lock is engaged in said socket.

2. An automatic cycle storage system according to claim 1, in which the socket is in the vicinity of the locking member and is disposed so that the pin of the anti-theft cycle lock extends substantially horizontally on the same side as the locking member when said pin of the anti-theft cycle lock is engaged in said socket.

3. An automatic cycle storage system according to claim 1, in which the socket is disposed towards the front relative to the locking member in the insertion direction in which said locking member is inserted into the keeper.

4. An automatic cycle storage system according to claim 1, in which the socket is provided in a box that carries the locking member and that is secured to the cycle.

5. An automatic cycle storage system according to claim 1, in which the cycle also has a key lock operated by a key and enabling the key to be extracted from the key lock only when the key is in a predetermined angular position, the key lock also having a latch that is mounted to move with the key and that is adapted to co-operate with the pin of the anti-theft cycle lock when the pin of the anti-theft cycle lock is engaged in the socket, the latch also being adapted to co-operate with the pin of the anti-theft cycle lock so that said key is in said predetermined angular position only when the pin of the anti-theft cycle lock is locked in the socket.

6. An automatic cycle storage system according to claim 5, in which the latch is adapted to penetrate into said socket when said key is in the predetermined position, said latch being urged resiliently towards a locking position corresponding to said predetermined angular position of the key, the socket also including a slidably mounted blocking member that is urged towards a rest position in which said blocking member prevents the latch from reaching said locking position, said blocking member being adapted to be pushed back by the pin of the anti-theft cycle lock while enabling said pin of the anti-theft cycle lock to co-operate with the latch.

7. An automatic cycle storage system according to claim 5, in which the pin of the anti-theft cycle lock is provided with a side recess adapted to receive the latch.

8. An automatic cycle storage system according to claim 5, in which the key lock is surrounded at least partially by a key-cover wall that projects towards the keeper and that is adapted to mask the key when the cycle is locked to the locking station.

9. An automatic cycle storage system according to claim 1, in which the keeper is adapted to prevent the anti-theft cycle lock from being placed in a position in which it immobilizes the cycle when said cycle is locked to the locking station.

* * * * *